United States Patent Office 3,663,701
Patented May 16, 1972

3,663,701
SUBSTITUTED THIOCYANO PYRROLES, FUNGICIDAL PREPARATIONS CONTAINING THESE COMPOUNDS AS ACTIVE INGREDIENTS AND METHODS OF USING THE SAME
Stig Hjalmar Johannes Akerstrom, Uppsala, Sweden, assignor to U.S. Philips Corporation, New York, N.Y.
No Drawing. Original application Dec. 19, 1966, Ser. No. 602,598. Divided and this application Sept. 15, 1969, Ser. No. 858,123
Claims priority, application Sweden, Dec. 20, 1965, 16,447/65
Int. Cl. A01n 9/12, 9/22
U.S. Cl. 424—274       3 Claims

ABSTRACT OF THE DISCLOSURE

Substituted dithiocyanopyrroles have been found to be useful as antifungal agents for combatting plant harmful fungi.

---

This application is a division of my copending application Ser. No. 602,598, filed Dec. 19, 1966, and now abandoned.

The present invention relates to a compound with the following formula

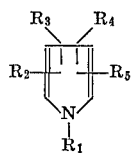

or a salt of same, in which $R_1$ is a hydrogen atom, a straight, a branched or a cyclic hydrocarbon chain, possibly with an amino group or a halogen group, an ester group or a hydroxy alkyl, $R_2$ and $R_5$ both are a thiocyano group, or one is, and the other is a hydrogen atom or an acyl group, $R_3$ and $R_4$ are chosen among hydroxy alkyl groups, hydrogen atoms or alkyl groups.

Compounds or mixtures of compounds under the above-mentioned formula have proved to be very efficient for use against formation of fungi or scabs on trees and plants. Positive effects have also been established when dressing seeds, the compounds or mixtures of the compounds then having considerable advantages compared with mercury. The reason for this is that the compounds are less toxic.

Very good results were obtained with N-phenyl $\alpha,\alpha'$-dithiocyanopyrrole and with its corresponding N-parachlorophenyl homologue. These compounds, and in particular the N-p-chloro-phenyl derivative are active against *Venturia inaequalis*, *Fusarium culmorum* and also against *Podosphaera leucotricha* (apple powdery mildew).

Also for pharmaceuticals, compounds or mixtures of compounds falling under the above-mentioned formula have proved to be useful as fungicides and antiseptics, in that the growth of skin fungi is prevented, and bacteria are killed. When using it as a pharmaceutical, it is extremely appropriate to utilize a liquid plastic dressing as a carrier for the compound or mixture of compounds used. An example of an appropriate plastic dressing is polybutoxy ethyl methacrylate. When a compound or a mixture of compounds is used, the actual compound or the compounds comprised in the mixture can be used, or salts of the compound or compounds can be used. The salts can consist of hydrochloride, sulphate, acetate etc.

Depending upon the circumstances under which they are to be used, the compounds or salts can be mixed with a appropriate carrier, which can be either solid, semi-solid or liquid. The carrier itself can, of course, consist of a number of different components.

When producing substituted thiocyano pyrrole, one or two thiocyano groups are added to a substituted or an unsubstituted pyrrole ring, of which the substituents then are not thiocyano groups, by allowing free thiocyanogen to react with the pyrrole ring. The free thiocyanogen can be obtained as a reaction between an alkali metal thiocyanate, or an ammonium thiocyanate and an appropriate oxidizer, such as halogen, a monochlorocarbamide, or a dichlorocarbamide. Also electrolytic oxidation can be used. A further alternative for forming free thiocyanogen is to decompose a cyanate of a heavy metal, such as copper. At such a decomposition it is appropriate to have a catalyst, such as aluminium trichloride or aluminium tricyanate. The formation of the free cyanogen can appropriately take place in a solvent, which can be formic acid, acetic acid, methyl acetate, chloroform, carbon tetrachloride, methanol or hydrochloric acid.

The thiocyano groups can also be added to the pyrrole ring through Sandmeyer's method, or by treating a pyrrole derivative with a halogen thiocyanogen.

In the following, 16 different examples of methods of producing substituted thiocyano pyrroles according to the present invention will be given.

Example 1.—N-methyl-$\alpha,\alpha'$-dithiocyanopyrrole

Three hundred grams of potassium thiocyanate and 500 ml. of methanol were placed in a flask fitted with a mechanical stirrer and a thermometer, then chilled in a Dry Ice-acetone bath to about $-65°$ C. The mixture was stirred and kept below $-55°$ C., while a chilled bromine solution, containing 74.5 ml. of bromine in 200 ml. of methanol, was added from a dropping funnel. A solution of 48.6 g. of redistilled N-methylpyrrole (B.P. 114–117° C.) in 200 ml. of methanol, also chilled to $-65°$ C., was added as rapidly as possible to the above solution. After stirring for about 40 min. after all N-methylpyrrole solution was added, the temperature of the reaction mixture was about $-40°$ C. The mixture was poured into 1000 ml. of water and agitated for about 0.5 hours. The precipitate of N-methyl-$\alpha,\alpha'$-dithiocyanopyrrole was collected on a Büchner funnel, washed with water, dried and recrystallized from alcohol to yield 91 g., M.P. 118–120° C. By evaporation of the mother liquid an additional crude product was obtained which weighed 18 grams.

$C_7H_5N_3S_2$: S—calculated, 32.8%; Found, 32.2%.

Example 2.—$\alpha,\alpha'$-Dithiocyanopyrrole

The procedure according to the present example corresponds to the procedure of Example 1 with the exception of that the following chemicals were used: 150 g. of potassium thiocyanate dissolved in 200 ml. of methanol, 34 ml. of bromine dissolved in 50 ml. of methanol, 24.8 g. of pyrrole dissolved in 100 ml. of methanol.

The reaction mixture was poured onto 200 g. of crushed ice and the $\alpha,\alpha'$-dithiocyanopyrrole was collected on a Büchner funnel, washed with water, dried and recrystallized from water. Melting point 114–116° C.

$C_6H_3N_3S_2$: S—calculated, 35.4%; found, 35.2%.

Example 3.—N-butyl-$\alpha,\alpha'$-dithiocyanopyrrole

The procedure as in Example 1 with the exception of that the following chemicals were used: 25 g. of potassium thiocyanate dissolved in 100 ml. of methanol, 6.5 ml. of bromine dissolved in 50 ml. of methanol and 6.1 g. of N-butylpyrrole B.P. at 15 mm. Hg 62–70° C. dissolved in 50 ml. of methanol.

The reaction mixture was poured onto 200 g. of crushed ice, and the N-butyl-α,α'-dithiocyanopyrrole was extracted with two portions of chloroform, each of 50 ml. The solution was dried, filtered and evaporated under reduced pressure. The residue was a thick oil which after standing in a refrigerator for some time solidified. The substance had a M.P. of 24–28° C.

$C_{10}H_{11}N_3S_2$: S—calculated, 27.9%; found, 25.4%.

Example 4.—N-(β-hydroxyethyl)-α,α'-dithiocyanopyrrole

The procedure as in Example 1 with the exception of that the following chemicals were used: 25 g. of potassium thiocyanate dissolved in 100 ml. of methanol, 6.5 g. of bromine dissolved in 50 ml. of methanol and 5.5 g. of N-(β-hydroxyethyl)-pyrrole B.P. at 3 mm. Hg 66–76° C. dissolved in 50 ml. of methanol.

The reaction mixture was worked up as in Example 2. The N-(β-hydroxyethyl)-α,α'-dithiocyanopyrrole was recrystallized in alcohol. Melting point 78–80° C.

$C_8H_7N_3OS_2$: S—calculated, 28.5%; found, 28.3%.

Example 5.—N-cyclohexyl-α,α'-dithiocyanopyrrole

The procedure as in Example 1 with the exception of that the following chemicals were used: 25 g. of potassium thiocyanate dissolved in 100 ml. of methanol, 6.3 ml. of bromine dissolved in 50 ml. of methanol, 7.1 g. of N-cyclo-hexylpyrrole, B.P. at 3 mm. Hg 68–74° C. dissolved in 50 ml. of methanol.

The reaction mixture was worked up as in Example 3. The residue was crystallized in alcohol, and had a M.P. 66–68° C.

$C_{12}H_{13}N_3S_2$: S—calculated, 24.3%; found, 23.5%.

Example 6.—N-benzyl-α,α'-dithiocyanopyrrole

The procedure as in Example 1 with the exception of that the following chemicals were used: 18 g. of potassium thiocyanate dissolved in 50 ml. of methanol, 5.9 g. of bromine dissolved in 50 ml. of methanol and 5.7 g. of N-benzylpyrrole, B.P. at 15 mm. Hg 123–130° C. dissolved in 50 ml. of methanol.

The reaction mixture was worked up as in Example 2. The product was recrystallized in benzene-ligroin. M.P. 93–96° C.

$C_{13}H_9N_3S_2$: S—calculated, 22.6%; found, 22.8%.

Example 7.—N-phenyl-α,α'-dithiocyanopyrrole

The procedure as in Example 1 with the exception of that the following chemicals were used: 25.2 g. of potassium thiocyanate dissolved in 50 ml. of methanol, 6.2 ml. of bromine dissolved in 50 ml. of methanol and 7.2 g. of N-phenylpyrrole, B.P. at 15 mm. Hg 110–115° C. and M.P. 60–61° C., dissolved in 50 ml. of methanol.

The reaction mixture was worked up as in Example 2. The product was recrystallized in benzene-ligroin. M.P. 162–164° C.

$C_{12}H_7N_3S_2$: S—calculated, 24.9%; found, 24.7%.

Example 8.—α-Thiocyano-α'-acetylpyrrole

The procedure as in Example 1 with the exception of that the following chemicals were used: 24 g. of potassium thiocyanate dissolved in 50 ml. of methanol, 5.8 ml. of bromine dissolved in 50 ml. of methanol and 8.5 g. of methyl-α-pyrrylketone, M.P. 92–93° C. dissolved in 50 ml. of methanol.

The reaction mixture was worked up as in Example 2. The product was recrystallized in benzene-ligroin, M.P. 110–138° C. The sulphur content agrees with the calculated. The possibility of an isomeric mixture seems to be probable. After repeated recrystallizing, however, the M.P. was raised to 142–143° C.

$C_7H_6N_2OS$: S—calculated, 19.3%; found, 19.2%.

Example 9.—N-methyl-α-thiocyanopyrrole 75 g. of potassium thiocyanate and 150 ml. of methanol were placed in a flask fitted with a mechanical stirrer and a thermometer, then chilled in a Dry Ice-acetone bath to about —60° C. The mixture was stirred and kept below —55° C. while a chilled bromine solution, containing 16.5 ml. of bromine in 50 ml. of methanol was added from a dropping funnel. The stirring was continued for a further 10 min. after all bromine solution was added. This reaction mixture was then added to a solution of 24.3 g. of N-methylpyrrole (B.P. 114–117° ) in 200 ml. of methanol also chilled to —65° C. After stirring for about 50 min. the temperature of the reaction mixture was about —30° C. and then poured into 200 ml. of a saturated salt solution. After extracting the solution with two 50-ml. portions of chloroform, the latter was dried, filtered and distilled. The boiling point of the solution was 108–110° C. at 13 mm. Hg.

$C_6H_6N_2S$: S—calculated, 23.2%; found, 23.2%.

Example 10.—2,5-dimethyl-3,4-dithiocyanopyrrole

The procedure as in Example 1 with the exception of that the following chemicals were used: 60 g. of potassium thiocyanate dissolved in 75 ml. of methanol, 13.8 ml. of bromine dissolved in 50 ml. of methanol and 14.1 g. of 2,5-dimethylpyrrole, B.P. 129–131° C. dissolved in 40 ml. of methanol.

The reaction mixture was worked up as in Example 2. The product was recrystallized from ether-ligroin and then from benzene-ligroin, M.P. 134–136° C.

$C_8H_7N_3S_2$—Calculated: S, 30.6%; found: S, 30.2%.

Example 11.—N-ethyl-2,5-dimethyl-3,4-dithiocyanopyrrole

The procedure as in Example 1 with the exception of that the following chemicals were used: 20 g. of potassium thiocyanate dissolved in 25 ml. of methanol, 8.1 ml. of bromine dissolved in 25 ml. of methanol and 7.0 g. of N-ethyl-2,5-dimethylpyrrole, B.P. at 10 mm. Hg 61° C. dissolved in 25 ml. of methanol.

The reaction mixture was worked up as in Example 2. The product was recrystallized in benzene, M.P. 132–133° C.

$C_{10}H_{11}N_3S_2$—Calculated: S, 27.0%; found: S, 27.1%.

Example 12.—N-propyl-2,5-dimethyl-3,4-dithiocyanopyrrole

The procedure as in Example 1 with the exception of that the following chemicals were used: 20 g. of potassium thiocyanate dissolved in 25 ml. of methanol, 8.1 ml. of bromine dissolved in 25 ml. of methanol and 7.0 g. of N-propyl-2,5-dimethylpyrrole, B.P. at 15 mm. Hg 78–83° C. dissolved in 25 ml. methanol.

The reaction mixture was worked up as in Example 2. The product was recrystallized in benzene-ligroin, M.P. 55—58° C.

$C_{11}H_{13}N_3S_2$.—Calculated: S, 25.5%; found: S, 24.9%.

Example 13.—N-butyl-2,5-dimethyl-3,4-dithiocyanopyrrole

The procedure as in Example 1 with the exception of that the following chemicals were used: 20 g. of potassium thiocyanate dissolved in 25 ml. of methanol, 8.1 ml. of bromine dissolved in 25 ml. of methanol and 7.5 g. of N-butyl-2,5-dimethylpyrrole, B.P. at 13 mm. Hg 83–85° C. dissolved in 50 ml. of methanol.

The reaction mixture was worked up as in Example 3. The residue was recrystallized in benzene-ligroin M.P. 82–83° C.

$C_{12}H_{15}N_3S_2$—Calculated: S, 24.2%; found S, 23.8%.

Example 14.—N-(β-hydroxyethyl)2,5-dimethyl-3,4-dithiocyanopyrrole

The procedure as in Example 1 with the exception of that the following chemicals were used: 20 g. of potassium thiocyanate dissolved in 25 ml. of methanol, 8.1 ml. of bromine dissolved in 25 ml. methanol. 7.0 g. N-(β-hydroxyethyl)-2,5-dimethylpyrrole, B.P. at 7 mm. Hg. 112–113° C. dissolved in 50 ml. of methanol.

The reaction mixture was worked up as in Example 2. The product was crystallized in benzene, M.P. 153–156° C.

$C_{10}H_{11}N_3OS_2$—Calculated: S, 25.3%; found: S, 24.8%.

Example 15.—N-carbmethoxymethyl-2,5-dimethyl-3,4-dithiocyanopyrrole

The procedure as in Example 1 with the exception of that the following chemicals were used: 25 g. of potassium thiocyanate dissolved in 100 ml. of methanol, 6.2 ml. of bromine dissolved in 50 ml. of methanol and 8.3 g. N-Carbmethoxy-2,5-dimethylpyrrole, B.P. at 12 mm. Hg 126° C., M.P. 42–46° C. dissolved in 50 ml. of methanol.

The reaction mixture was worked up as in Example 2. The product was recrystallized in benzene-ligroin, M.P. 131–135° C.

$C_{11}H_{11}N_3O_2S_2$.—Calculated: S, 22.2%; found, S, 22.3%.

Example 16.—N-($\beta$-aminoethyl)-2,5-dimethyl-3,4-dithiocyanopyrrole

The procedure as in Example 1 with the exception of that the following chemicals were used: 20 g. potassium thiocyanate dissolved in 25 ml. of methanol, 8.1 ml. of bromine dissolved in 25 ml. of methanol and 7.0 g. of N-($\beta$-aminoethyl)-2,5-dimethylpyrrole, B.P. at 10 mm. Hg 106° C. dissolved in 50 ml. of methanol.

The reaction mixture was worked up as in Example 2. The product was recrystallized in alcohol.

$C_{11}H_{13}N_5S_3$.—Calculated: S, 30.8%; found: S, 30.1%.

Example 17.—N-p-chlorophenyl-$\alpha,\alpha'$-dithiocyanopyrrole

The procedure as in Example 1 with the following exceptions: Chemicals: 8.5 g. of potassium thiocyanate in 50 ml. of methanol, 2.7 ml. of bromine in 25 ml. of methanol and 3 g. of N-p-chlorophenylpyrrole in 75 ml. of methanol.

Reaction temperature: −25 to −30° C.

The reaction mixture was worked up as in Example 2. The product was recrystallized from alcohol. Melting point 133–135° C.

$C_{12}H_6ClN_3S_2$:S—calculated, 21.8%; found, 21.3%.

Example 18

In the present example the substances according to Examples 1, 2, 3, 5, 6 and 7 were tested. Each substance as ground very carefully during 15 minutes. To the ground substance 3 mg. of a surfactant and 10 ml. of water were added. A few drops of a suspension of the substances were brought on two glass slides. A few drops of spores of *Fusarium culmorum* (cultured on agar) or *Venturia inaequalis* (collected from infected apple leaves) were mixed with the substances.

These mixtures were incubated during 48 hours. The negative logarithms of the concentration which gave complete inhibition of germination are summarized in the following table:

| Substances used— | Example | Fus. culm. | Vent. inaeq. |
|---|---|---|---|
| N-Methyl-$\alpha,\alpha'$-dithiocyanopyrrole | 1 | 6.2 | 6.8 |
| $\alpha,\alpha'$-dithiocyanopyrrole | 2 | 5.0 | 5.1 |
| N-butyl-$\alpha,\alpha'$-dithiocyanopyrrole | 3 | 5.6 | 6.2 |
| N-cyclohexyl-$\alpha,\alpha'$-dithiocyanopyrrole | 5 | 5.6 | 6.2 |
| N-benzyl-$\alpha,\alpha'$-dithiocyanopyrrole | 6 | 5.6 | 5.9 |
| N-phenyl-$\alpha,\alpha'$-dithiocyanopyrrole | 7 | 3.8 | 6.2 |
| N-p-chlorophenyl-$\alpha,\alpha'$-dithiocyano pyrrole | 17 | 6.2 | 6.2 |

Example 19

Suspensions (prepared as described in Example 18) of substances were sprayed on the lower sides of three tomato leaves (cultivar Bonny Best), placed into water (50 ml. bottles). Three bottles were used for each concentration. After drying, the lower sides of the leaves were infected by spraying them with a suspension of zoospores (100,000 ml.) of *Phytophthora infestans*, obtained from sporangia cultured on potato tubers.

The bottles containing the leaves were placed in climate rooms, where during 24 hours the temperature was 15 C., the rel. humidity 95%, the room dark, and where during 2 x 24 hours the temperature was 18° C., rel. humidity 85% and the room continuous fluorescent lit by 3000–6000 lux. The results were assessed by estimation of the beginning of growth of dark mycelium on the leaves. In the following table the results are expressed in percent of the infection on control leaves, non-treated with a chemical.

| Substance | Example | Concentration at— | | |
|---|---|---|---|---|
| | | $10^{-3.5}$ | $10^{-4.5}$ | $10^{-5.5}$ |
| N-methyl-$\alpha,\alpha'$-dithiocyanopyrrole | 1 | 0 | 30 | 70 |
| N-cyclohexyl-$\alpha,\alpha'$-dithiocyanopyrrole | 5 | 4 | 17 | 51 |
| N-phenyl-$\alpha,\alpha'$-dithiocyanopyrrole | 7 | 19 | 27 | 51 |
| N-benzyl-$\alpha,\alpha'$-dithiocyanopyrrole | 6 | 12 | 18 | 76 |
| N-p-chlorophenyl-$\alpha,\alpha'$-dithiocyanopyrrole | 17 | 15 | 29 | 100 |

Example 20

Apple root-stocks M II with one or two 20 cm. shoots were infected with suspensions of conidia of *Venturia inaequalis* collected from infected leaves. Cherry juice was added to the suspensions. The chemicals were sprayed immediately before infection (preventive test) or 24 hours after infection (curative test). Per shoot, 3 ml. of an appropriately diluted suspension was used.

The plants were kept wet for 48 hours after infection, then planted, and protected against rain throughout the experiment. After 2–3 weeks the growth of cycelium on the leaves was estimated and in the following table, expressed in percent of the growth of cycelium on shoots infected in the same way but not treated with a chemical.

| Substance | Example | Preventive or Curative | Concentration at— | | |
|---|---|---|---|---|---|
| | | | $10^{-2.5}$ | $10^{-3.5}$ | $10^{-4.5}$ |
| $\alpha,\alpha'$-dithiocyanopyrrole | 2 | P | | 8 | 0 |
| | 2 | P | 1 | | 19 |
| | 2 | C | 10 | | 53 |
| N-methyl-$\alpha,\alpha'$-dithiocyanopyrrole | 1 | P | | 0 | 0 |
| | 1 | C | | 27 | 59 |
| N-cyclohexyl-$\alpha,\alpha'$-dithiocyanopyrrole | 5 | P | | 0 | 0 |
| N-phenyl-$\alpha,\alpha'$-dithiocyanopyrrole | 7 | P | | 1 | 16 |
| N-benzyl-$\alpha,\alpha'$-dithiocyanopyrrole | 6 | P | | 4 | 6 |
| Captan | | P | | 0 | 0 |
| | | P | | 0 | 29 |

Example 21

The leaves of about 10 cm. high young celery plants (cultivar Balder) were sprayed with appropriately diluted suspensions of the substances. Each concentration was applied on 6 plants. After treatment the plants were infected by spraying with a suspension of spores (150,000/ml.) of *Septoria apii* collected from infected leaves. The plants were incubated during 14 days in a climate room (18° C.; 16 hours light, 8 hours dark; high humidity).

The results are obtained by estimating the spots per leaf and expressing their number in percent of that observed on non-treated but equally infected control leaves.

Example 22

10 g. of N-methyl-$\alpha,\alpha'$-dithiocyanopyrrole together with 10 g. of talcum were ground in a glass mill. 20 mg. of this preparation were mixed with 5 g. of beet seed naturally infected with *Thoma betae*. The seeds were sown in sterilized soil, which was kept at 10° C. during 12 days in an ice box and then 12 days in a Wisconsin tank in the green house (soil temp. 10° C.). Two experiments showed that apparently 97% and 100% respectively of the seedlings were protected against *Thoma betae*.

The results of the test are put together in the following table.

| | | Test organisms | | | |
|---|---|---|---|---|---|
| Substance | Ex. | M. aur.[1] | E. coli[2] | Cand. alb. | Asp. niger |
| | | Every figure value states the lowest concentration (μg./ml. substrat μm.), that has a growth inhibited influence | | | |
| α,α'-dithiocyanopyrrole | 2 | 40 | 8 | 8 | 40 |
| N-butyl-α,α'-dithiocyanopyrrole | 3 | 40 | 40 | 8 | 40 |
| N-benzyl-α,α'-dithiocyanopyrrole | 6 | 40 | 40 | 4 | 8 |
| N-phenyl-α,α'-dithiocyanopyrrole | 7 | + | + | 8 | 40 |
| α-thiocyano-α'-acetyl pyrrole | 8 | 100 | 100 | 40 | 40 |
| N-methyl-α,α'-dithiocyanopyrrole | 1 | 40 | 8 | 8 | 40 |

[1] Test solution 4.
[2] Test solution 6.

Example 23

10 g. of α,α'-dithiocyanopyrrole were ground in glass mill together with 10 g. of talcum. 10 g. of corn seeds with relatively low vitality were dressed with 50 mg. of this preparation. The dressed seeds (a hundred per experiment) were sown in garden soil, naturally infected with soil fungi (Pythium spec.), and kept at 10° C. in closed boxes for 10 days. Then the boxes were opened and kept 3 days at 25–30° C.

In three experiments 91, 98 and 100% respectively of the seeds were germinated.

In the following examples, Examples 24 and 25 it will be described how two powdery preparations according to the present application are prepared.

In the above table the "+" mark indicates that the highest concentration has not caused any inhibition in growth.

Example 27

In the present test the substances according to Examples 1 and 4 have been tested in the same way as described in the previous Example and the same concentrations have also been used. The two substances have been tested on the following micro-organisms: *Micrococcus aureus* 4, *Escherichia coli* 25, *Escherichia coli* H, *Salmonella typhi*, *Proteus vulgaris*, *Aerobacter aerogenes*, *Bacillus subtilis*, *Candida albicans*, *Aspergillus niger*, *Penicillium expansum*, *Trichiphyton mentagrophytes*, *Trichophyton ruburm*. The results obtained have been put together in the following table.

| | | Test organisms | | | | | | | | | | | |
|---|---|---|---|---|---|---|---|---|---|---|---|---|---|
| Substance | Ex. | M. aur. 4 | E. coli 25 | E. coli H | Salm. typhi | Prot. vugl. | Aer. aerog. | Bac. subt. | Cand. alb. | Asp. niger | Pen. exp. | Tri. rubr. | Tri. ment. |
| | | Every figure value states the lowest concentration (μg./ml. substratum), that has a growth inhibited influence after inoculation for 24 hours | | | | | | | | | | | |
| N-methyl-α,α'-dithiocyanopyrrole | 1 | 40 | 40 | 16 | 40 | 16 | 40 | 40 | 4 | 8 | 4 | 1 | 1 |
| α,α'-dithiocyanopyrrole | 2 | 16 | 16 | 16 | 16 | 16 | 40 | 16 | 4 | 16 | 16 | 1 | 2 |

[1] Test solution 4.  [2] Test solution 25.  [3] Test solution H.

Example 24

A wettable powder of N-methyl-α,α'-dithiocyanopyrrole was prepared by mixing 500 g. of this chemical, 440 g. of kaolin, 50 g. of a lignine sulfonate (Polyfon H) and 10 g. of oleyl N-methyl sodium taurate. This mixture was ground in an air mill until 95% of the particles measured less than 325 mesh.

Example 25

In the present example instead of 500 g. N-methyl-α,α'-dithiocyanopyrrole 250 g. of α,α'-dithiocyanopyrrole was used, which was mixed and milled together with 650 g. of kaolin, 70 g. of lignine sulfonate (Polyfon H) and 30 g. of a fatty alcohol sulfate (Nifapon).

In the following two examples, Ex. 26 and 27, it will be accounted for the results obtained from tests concerning the bactericidal and fungicidal effect of some of the substances according to the present application.

Example 26

In the present example the substances according to the Examples 1, 2, 3, 6, 7 and 8 have been tested. Five different test concentrations have been applied viz. 1, 4, 8, 40 and 100 μg./ml. In the tests four different microorganisms have been used viz. *Micrococcus aureus* 4, *Escherichia coli* 6, *Candida albicans* and *Aspergillus niger*. Solutions of the mentioned micro-organisms have been prepared in known way. The purpose of the tests was to establish the lowest concentration of the mentioned substances that inhibited the growth of the micro-organisms.

What is claimed is:

1. A method of combatting plant and seed harmful fungi comprising applying to said plants and seeds a fungicidally effective amount of a compound of the formula

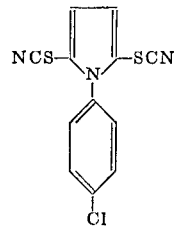

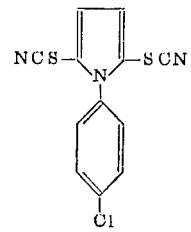

2. The method of claim 1 wherein the compound is applied to plants.

3. The method of claim 1 wherein the compound is applied to seeds.

References Cited

UNITED STATES PATENTS

| | | |
|---|---|---|
| 2,220,980 | 11/1940 | Horst. |
| 3,231,596 | 1/1966 | Knüsli et al. ......... 260—454 |
| 3,285,931 | 11/1966 | Huisgen ......... 260—326.3 X |

OTHER REFERENCES

Chemical Abstracts, vol. 56, 8667h, 1962.
Chemical Abstracts, vol. 55, 24714i, 1961.
Chemical Abstracts, vol. 32, 2560$^7$, 1938.

ALBERT T. MEYERS, Primary Examiner

D. J. FUNDERBURK, Assistant Examiner

U.S. Cl. X.R.

71—95